(12) United States Patent
Arnold et al.

(10) Patent No.: US 6,647,724 B1
(45) Date of Patent: Nov. 18, 2003

(54) ELECTRIC BOOST AND/OR GENERATOR

(75) Inventors: Steven Don Arnold, Rancho Palos Verdes, CA (US); Syed M. Shahed, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/209,535

(22) Filed: Jul. 30, 2002

(51) Int. Cl.[7] .................................................. F02B 33/44
(52) U.S. Cl. ............................. 60/608; 60/280; 60/601; 60/607
(58) Field of Search .......................... 60/607, 608, 280, 60/601

(56) References Cited

U.S. PATENT DOCUMENTS

| | | | |
|---|---|---|---|
| 5,038,566 A | * | 8/1991 | Hara .......................... 60/608 |
| 5,906,098 A | * | 5/1999 | Woollenweber et al. ...... 60/608 |
| 6,058,707 A | | 5/2000 | Bischoff |
| 6,062,026 A | * | 5/2000 | Woollenweber et al. ... 60/605.2 |
| 6,067,798 A | | 5/2000 | Okada et al. |
| 6,067,799 A | | 5/2000 | Heinitz et al. |
| 6,089,018 A | | 7/2000 | Bischoff et al. |
| 6,134,888 A | | 10/2000 | Zimmer et al. |
| 6,134,890 A | | 10/2000 | Church et al. |
| 6,161,384 A | | 12/2000 | Reinbold et al. |
| 6,233,934 B1 | | 5/2001 | Church et al. |
| 6,256,993 B1 | | 7/2001 | Halimi et al. |
| 6,272,859 B1 | | 8/2001 | Barnes et al. |
| 6,314,736 B1 | | 11/2001 | Daudel et al. |
| 6,338,250 B1 | | 1/2002 | Mackay |
| 6,397,597 B1 | | 6/2002 | Gartner |

* cited by examiner

Primary Examiner—Sheldon J. Richter
(74) Attorney, Agent, or Firm—Ephram Starr; Brian Pangrle (57) ABSTRACT

Exemplary methods, devices and/or system for enhancing engine performance through use of one or more compressors and/or one or more turbines. An exemplary system includes an electric compressor to boost intake charge pressure supplied to an internal combustion engine; an electric turbine to generate electrical power from exhaust received from the internal combustion engine; and an electric power control to provide electrical power from a power storage to the electric compressor upon a request for boost and to provide electrical power generated by the electric turbine to the electric compressor after a request for boost and upon a depletion of the power storage to a predetermined power storage level. Various other exemplary methods, devices and/or systems are also disclosed.

37 Claims, 10 Drawing Sheets

ELECTRIC BOOST AND/OR GENERATOR

TECHNICAL FIELD

Subject matter disclosed herein relates generally to methods, devices, and/or systems for enhancing engine performance through use of an electrically driven compressor and/or a turbine generator.

BACKGROUND

Methods, devices and/or systems that boost intake charge pressure (e.g., defined as force per unit area or energy per unit volume) often extract energy mechanically from a rotating shaft powered by combustion. For example, a turbocharger typically includes a compressor and a turbine attached to a single shaft wherein the turbine extracts energy from exhaust, which causes rotation of the shaft, and, consequently, a boost in intake charge pressure by the compressor. As another example, consider a supercharger, which boosts intake charge pressure using a compressor powered mechanically by a drive shaft or the like.

Recently, electric assist devices have been proposed. For example, an electrically driven compressor includes an electric motor powered by a vehicle's battery system wherein the electric motor drives a supercharger to boost intake charge pressure. Also consider an electrically assisted turbocharger that includes an electric motor and generator device capable of accelerating or decelerating a turbocharger shaft.

Methods, devices and/or systems having functionality of the aforementioned electrically driven compressor, the aforementioned electrically assisted turbocharger and/or other functionality are described below.

BRIEF DESCRIPTION OF THE DRAWINGS

A more complete understanding of the various methods, devices and/or systems described herein, and equivalents thereof, may be had by reference to the following detailed description when taken in conjunction with the accompanying drawings wherein.

DETAILED DESCRIPTION

Turning to the drawings, wherein like reference numerals refer to like elements, various methods are illustrated as being implemented in a suitable control and/or computing environment. Although not required, various methods are described in the general context of computer-executable instructions, such as program modules, being executed by a computer and/or other computing device. Generally, program modules include routines, programs, objects, components, data structures, etc., that perform particular tasks or implement particular abstract data types.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to control a device and/or a system. As such, the processes are implemented as machine-readable instructions storable in memory that, when executed by a processor, perform various acts illustrated as blocks. In addition, various diagrams include individual "blocks" that are optionally structural elements of a device and/or a system. For example, a "controller block" optionally includes a controller as a structural element, a "detector block" optionally includes a detector as a structural element, a "turbocharger block" optionally includes a turbocharger as a structural element, etc.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Figure 1:
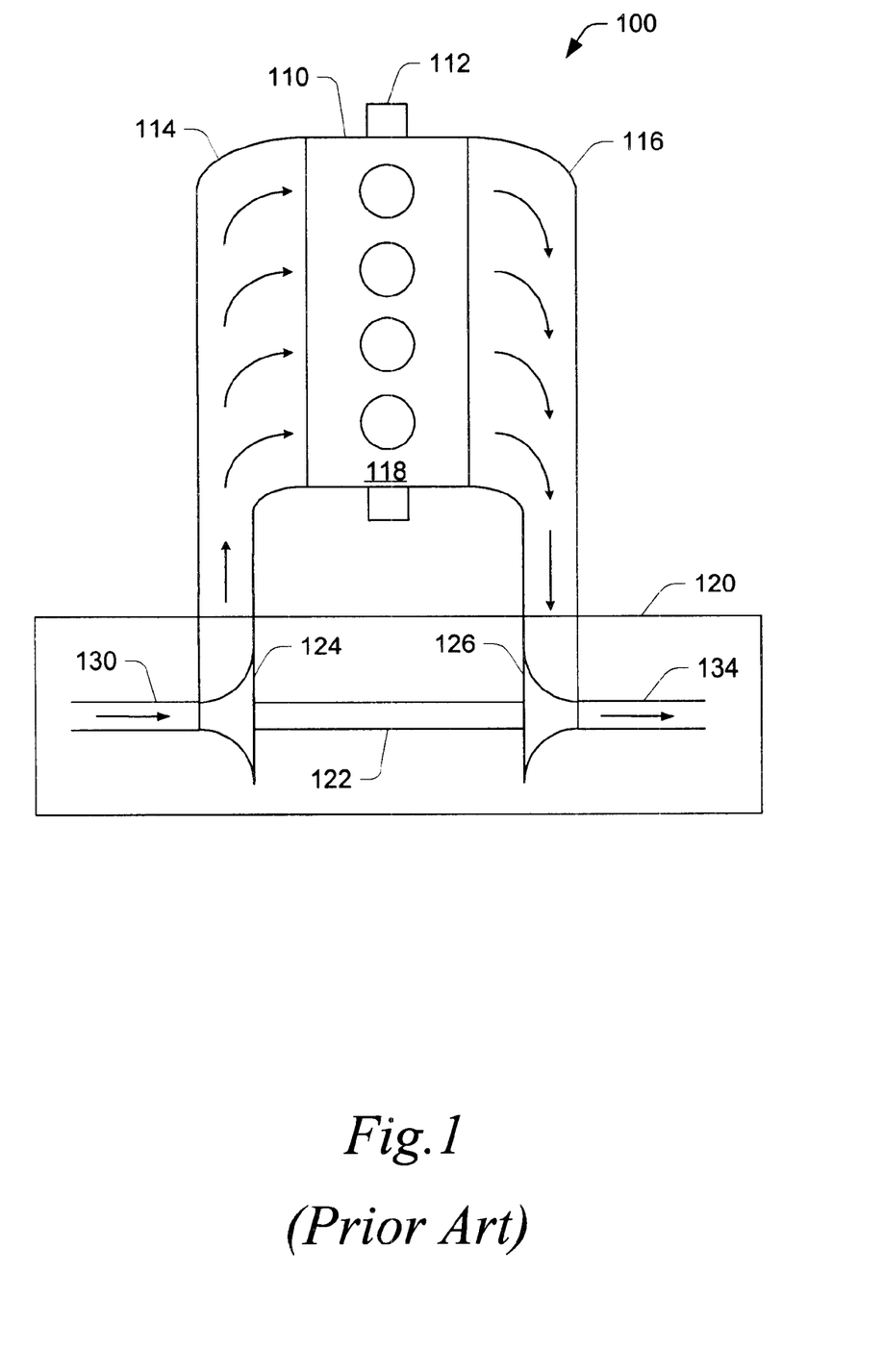
FIG. 1 is a simplified approximate diagram illustrating a turbocharger and an internal combustion engine.

Turbochargers are frequently utilized to increase the output of an internal combustion engine. Referring to FIG. 1, an exemplary system 100, including an exemplary turbocharger 120 and an exemplary internal combustion engine 110, is shown. The internal combustion engine 110 includes an engine block 118 housing one or more combustion chambers that operatively drive a shaft 112. As shown in FIG. 1, an intake port 114 provides a flow path for combustion gas (e.g., air) or intake charge to the engine block while an exhaust port 116 provides a flow path for exhaust from the engine block 118.

The exemplary turbocharger 120 acts to extract energy from the exhaust and to provide energy to the intake charge. As shown in FIG. 1, the turbocharger 120 includes an intake charge inlet 130, a shaft 122 having a compressor 124, a turbine 126 and an exhaust outlet 134. Exhaust from the engine 110 diverted to the turbine 126 causes the shaft 122 to rotate, which, in turn, rotates the compressor 124. The compressor 124 when rotating energizes combustion gas (e.g., ambient air) to produces a "boost" in the intake charge pressure (e.g., force per unit area or energy per unit volume), which is commonly referred to as "boost pressure." In this manner, a turbocharger may help to provide a larger intake charge mass (typically mixed with a carbon-based and/or hydrogen-based fuel) to the engine, which translates to greater engine output during combustion.

Figure 2:
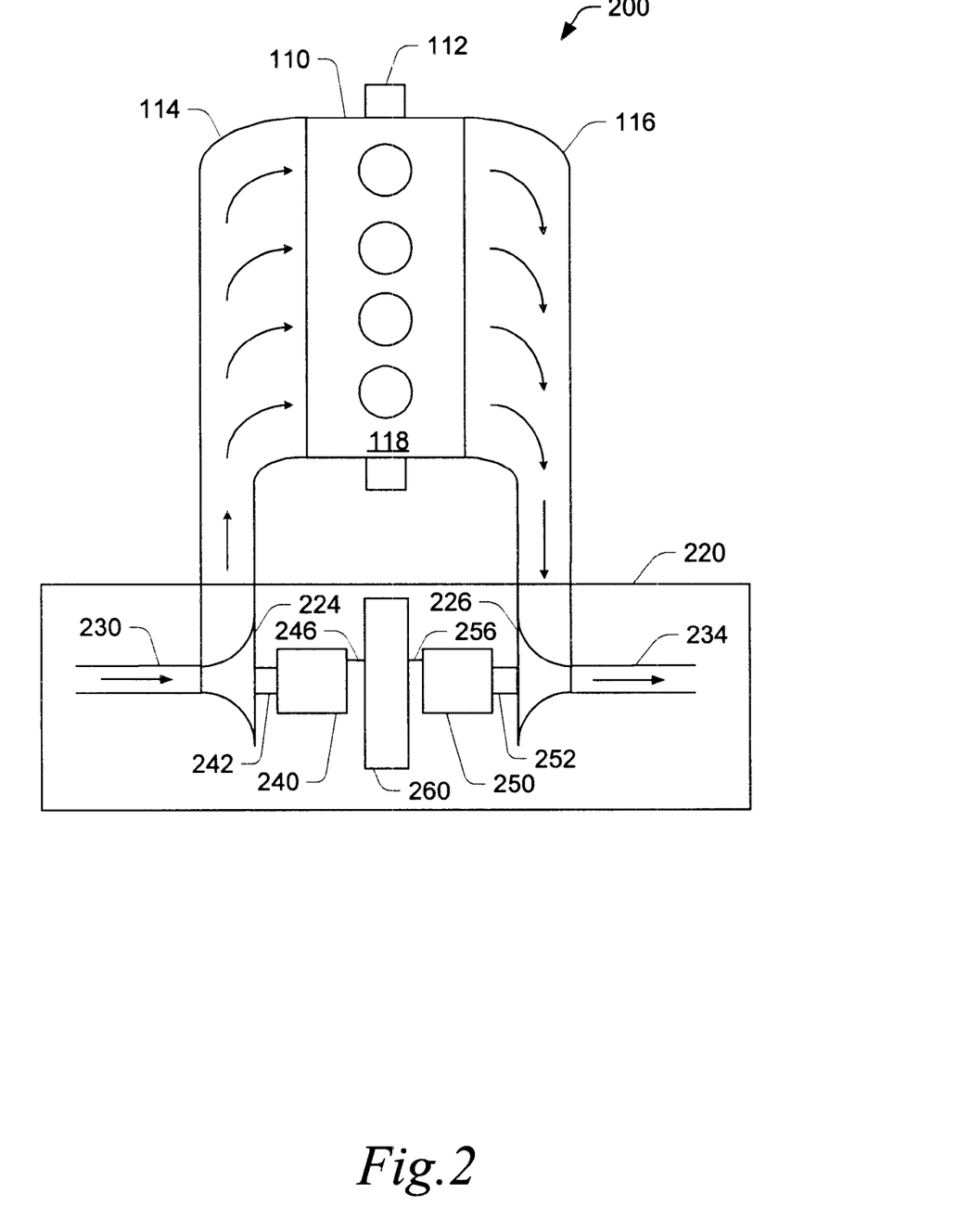
FIG. 2 is a simplified approximate diagram illustrating an exemplary boost system and an internal combustion engine.

Referring to FIG. 2, an exemplary system 200, including an exemplary boost/generation system 220 and the exemplary internal combustion engine 110 of FIG. 1, is shown. The exemplary boost/generation system 220 acts to extract energy from the exhaust and to provide energy to the intake charge. As shown in FIG. 2, the boost/generation system 220 includes an intake charge inlet 230, a compressor 224, a turbine 226 and an exhaust outlet 234. The exemplary boost/generation system 220 also includes an electric compressor unit 240, an electric turbine unit 250 and an electric control unit 260. The electric compressor unit 240, which is coupled to the electric control unit 260 via a link 246, includes a motor and a first rotatable shaft 242 operatively coupled to the compressor 224. The link 246 serves as a power input and/or a control input for the electric compressor unit 240. The electric turbine unit 250, which is coupled to the electric control unit 260 via another link 256, includes a generator and a second rotatable shaft 252 operatively coupled to the turbine 226.

Exhaust from the engine 110 diverted to the turbine 226 causes the shaft 252 to rotate, which, in turn, causes the electric turbine unit 250 to generate power. Of course, the electric turbine unit 250 may optionally operate to decelerate the turbine 226, for example, by electrical, magnetic and/or mechanical loading, typically applied via the shaft 252. The electric turbine unit 250 typically transmits generated power to the electric control unit 260 (e.g., via the link 256). The electric control unit 260 optionally stores the transmitted generated power and/or directs the power to the electric compressor unit 240 (e.g., via the link 246). The electric compressor unit 240 may use power provided from the electric control unit 260 to rotate the shaft 242 (e.g., via a motor) and thereby drive the compressor 224.

Of course, the electric compressor unit 240, the electric control unit 260 and the electric turbine unit 250 may be integrated into one unit having a shaft (e.g., the shaft 242) operatively coupled to the compressor 224 and another shaft (e.g., the shaft 252) operatively coupled to the turbine 226. Alternatively, the electric compressor unit 240 or the electric turbine unit 250 and the electric control unit 260 are integrated into one unit having a shaft (e.g., the shaft 242) operatively coupled to the compressor 224 or a shaft (e.g., the shaft 252) operatively coupled to the turbine 226. In another alternative, the electric compressor unit 240 and the electric turbine unit 250 are integrated into one unit having a shaft (e.g., the shaft 242) operatively coupled to the compressor 224 and another shaft (e.g., the shaft 252) operatively coupled to the turbine 226.

An exemplary electric compressor unit (e.g., the compressor unit 240) includes a motor capable of outputting power at a level sufficient to rotate a compressor (e.g., the compressor 242). For example, an exemplary compressor includes a motor capable of outputting power at a level of up to approximately 20 HP to approximately 30 HP and/or capable of rotating a compressor (e.g., the compressor 242) at a rate of up to approximately 250,000 rpm or more. An exemplary compressor unit (e.g., the compressor unit 240) optionally operates at a voltage of approximately 12 V to 300 V or more. For example, an exemplary compressor unit may operate at a voltage greater than approximately 24 V. The aforementioned power levels and speeds typically depend on compressor size, in addition, larger size engines may require higher power levels and lower speeds. Of course, a compressor unit capable of achieving other power levels and/or other speeds is also possible.

Figure 3:
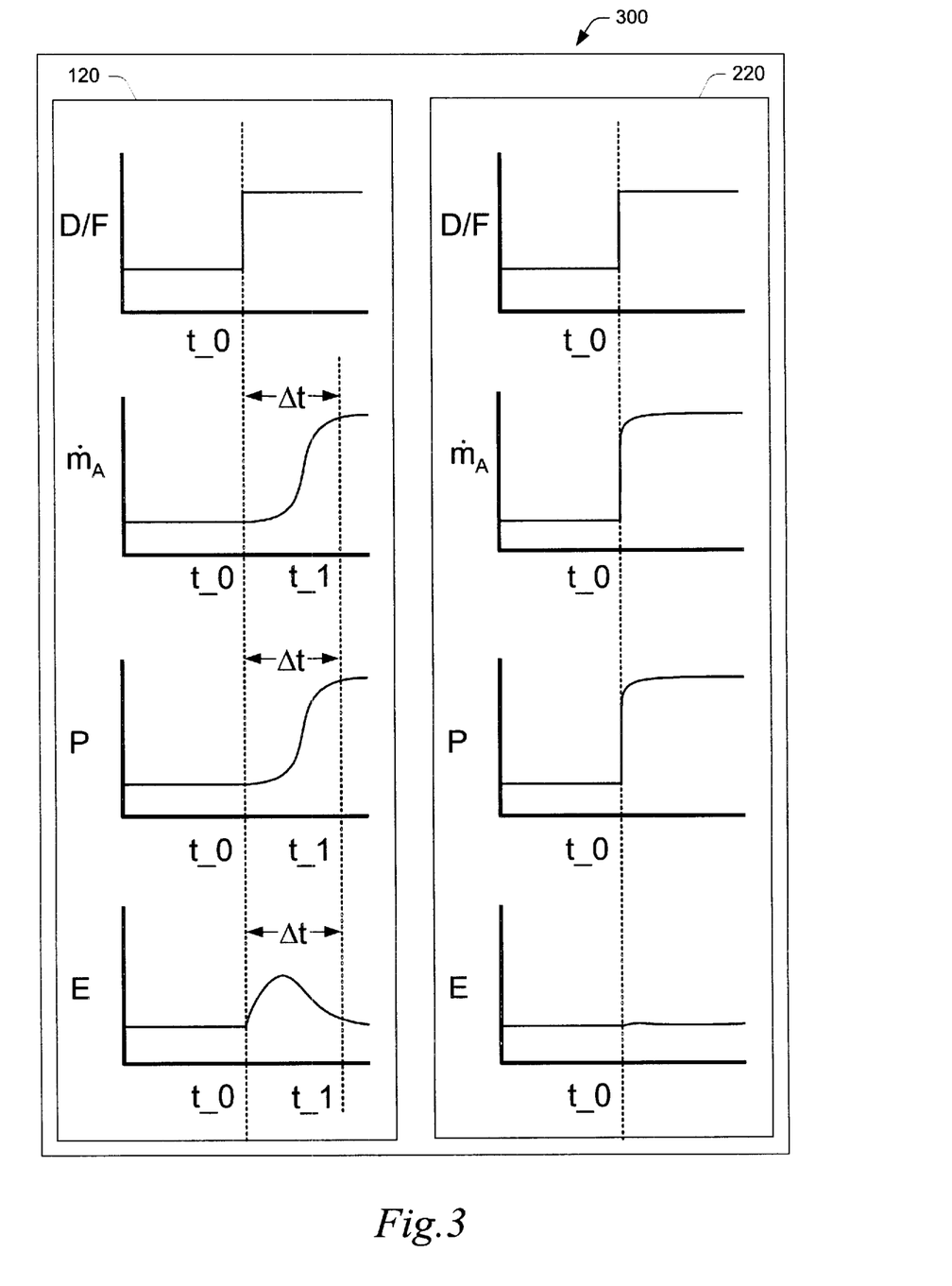
FIG. 3 is a simplified approximate graphical diagram illustrating exemplary behavior of the turbocharger and the internal combustion engine of FIG. 1 and the exemplary boost system and the internal combustion engine of FIG. 2.

Various exemplary methods, devices and/or systems disclosed herein typically operate to enhance performance of an internal combustion engine. Performance includes, for example, power, torque, efficiency, emissions, etc. Referring to FIG. 3, exemplary simplified, approximate graphs 300 are shown for the turbocharger 120 of FIG. 1 and for the exemplary boost and/or generation system 220 of FIG. 2. One set of graphs labeled 120 is associated with the turbocharger 120 of FIG. 1 while another set of graphs labeled 220 is associated with the exemplary boost/generation system 220 of FIG. 2.

Referring to the set of graphs 120, graphs for power demand and/or fuel flow with respect to time, airflow with respect to time, engine power with respect to time and emissions with respect to time are shown. Referring to the graph for demand and/or fuel flow (D/F) with respect to time, at a time of approximately t_0, demand and/or fuel flow increases. In response to the increase in demand and/or fuel flow, airflow (e.g., $\dot{m}_A$ or mass air flow) increases, leveling off at a time of approximately t_1. In this example, an air flow time delay ($\Delta t_A$) exists between the time t_0 and the time t_1. Similarly, a time delay exists in engine power ($\Delta t_P$) and potentially in emissions ($\Delta t_E$). In turbocharged engines, such delays are often characterized as "turbo lag". Various exemplary methods, devices and/or systems described herein, and/or equivalents thereof, operate to reduce such time delays.

Referring to the set of graphs 220, an increase in demand and/or fuel flow occurs at a time of approximately t_0. In response to the increase in demand and/or fuel flow, a controller (e.g., the electric control unit 260 of FIG. 2), provides power to an electric compressor unit (e.g., the electric compressor unit 240 of FIG. 2). In turn, the electric compressor unit drives a shaft (e.g., the shaft 242 of FIG. 2) operatively coupled to a compressor (e.g., the compressor 224 of FIG. 2) to thereby boost air pressure and hence air flow to an internal combustion engine (e.g., internal combustion engine 110 of FIG. 2). Note that in the graph of airflow ($\dot{m}_A$) with respect to time, the airflow increases nearly instantaneously at approximately time t_0. Thus, the exemplary system reduces and/or substantially eliminates the delay time associated with the turbocharger 120. Further note that similar behavior is shown in the graph of power (P) versus time. In addition, corresponding emissions (E) are potentially reduced in response to the increase in demand and/or fuel flow (D/F).

Figure 4:
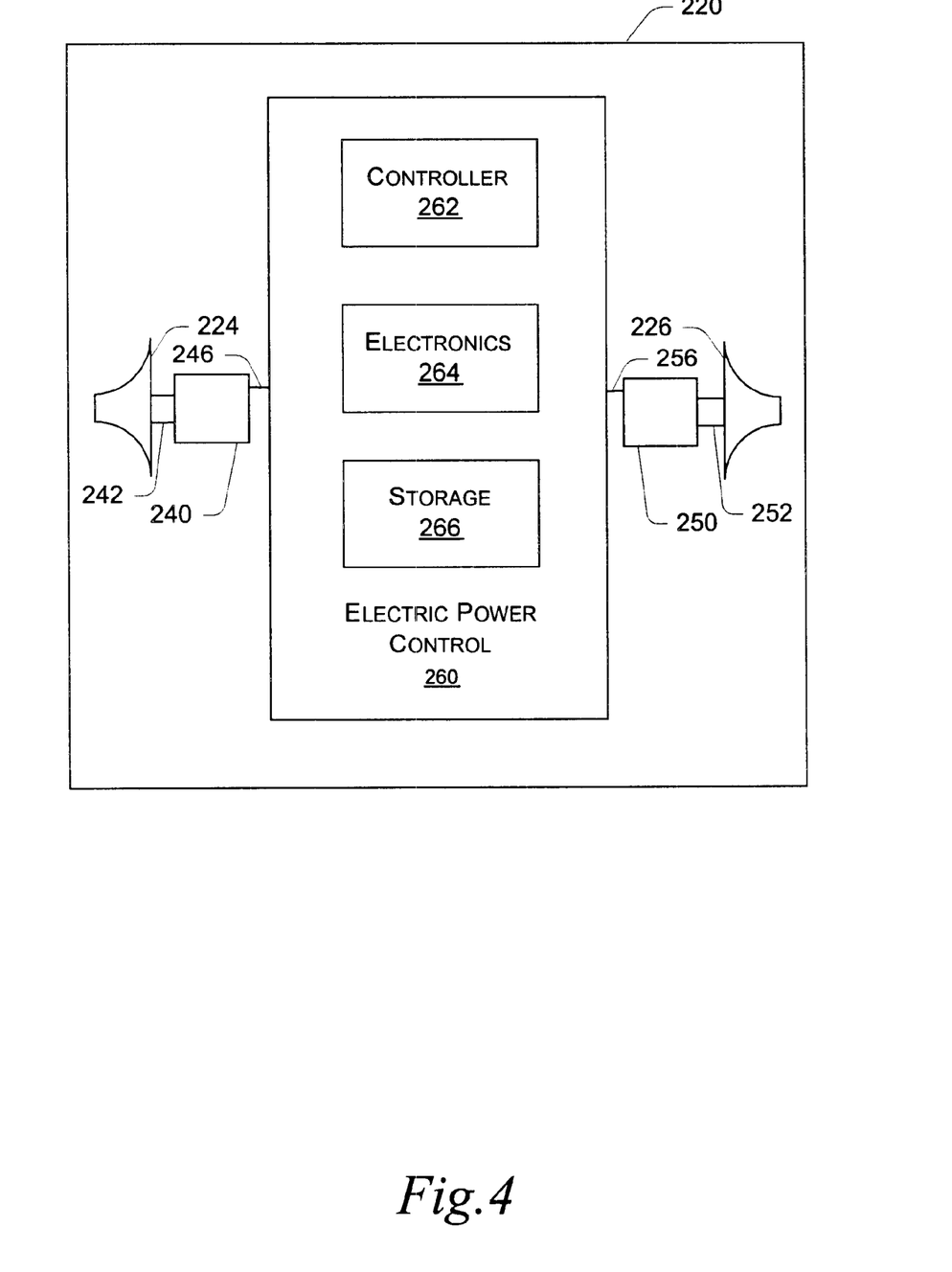
FIG. 4 is a block diagram illustrating an exemplary boost system.

Referring to FIG. 4, a block diagram of various components of the exemplary system 220 of FIG. 2 is shown. The exemplary system 220 includes an electric compressor unit 240, an electric turbine unit 250 and an electric control unit 260. The electric control unit 260 includes a controller 262, power electronics 264 and electrical power storage 266. In general, the controller 262 has one or more communication links with the power electronics 264 and/or the electrical power storage 266. Such links optionally allow for control of the power electronics 264 and/or the power storage 266 via the controller 262. Further, the controller 262 may control input of power from the electric turbine unit 250 via the link 252 and/or output of power from the electric control unit 260 to the electric compressor unit 240 via the link 242. An exemplary controller may also include a switch for switching operation of an electric motor from a power storage (e.g., the power storage 266) to another power source. A switch may alternatively, or in addition to, allow for recharging of a power storage. For example, after depletion of a power storage to a predetermined power storage level, a switch may switch to another power source to power an electric motor and/or recharge the power storage. Of course, an electric turbine unit 250 may act as another power source. Regarding the predetermined power storage level, this level optionally depends on factors such as cycle time, total cycles, lifespan, charge/discharge characteristics, etc. Such a level is optionally programmed and/or determined by a controller and/or other device.

An exemplary controller (e.g., the controller 262) may also include an input for receiving information pertaining to operation of an internal combustion engine. Further, such a controller may include control logic and/or other determination means for determining, based at least in part on the information, whether to boost intake charge pressure supplied to the internal combustion engine. Addition control logic and/or control means may then direct electrical power from a power storage to an electric compressor upon a determination to boost and/or direct electrical power generated by an electric turbine to the electric compressor after the determination to boost and upon a depletion of the power storage to a predetermined power storage level.

As already mentioned, an exemplary compressor unit (e.g., the compressor unit 240) optionally operates at a voltage of approximately 12 V to approximately 300 V or more. In general, compressor unit operational voltages exceed those typically used in a vehicle's electrical system. Further, the power available in a typical vehicle's electrical system may not adequately meet power demands of some exemplary electrical compressor units.

An exemplary power storage (e.g., the power storage 266) includes one or more capacitors and/or batteries. In general, such capacitors and/or batteries are capable of providing an electric compressor unit (e.g., the compressor unit 240) with power sufficient to increase intake charge pressure. In general, batteries tend to have longer charge times when compared to capacitors. One type of capacitor, sometimes referred to as "super capacitors", includes high energy capacitors and high power capacitors. High energy capacitors typically have charging times on the order of hundreds of seconds and high power capacitors typically have charging times on the order of approximately 10 seconds; other capacitors may have longer or shorter charge times. Suitable supercapacitors, individually or grouped, may be capable of producing voltages from several volts to over 300 volts, may be capable of more than 100,000 cycles, and may be rated at more than approximately 1 kJ. Various exemplary systems described herein optionally include supercapacitors for power storage. In addition, various exemplary systems include a power storage that is isolated from a vehicle's primary electrical system and/or a power storage that operates at a voltage level higher than a vehicle's primary electrical system.

An exemplary power storage, controller or power electronics may also include circuitry, such as, but not limited to, rectifier circuitry and voltage multiplier circuitry, to rectify current and increase voltage, respectively. For example, rectifier circuitry may operate to rectify an alternating current to a direct current and voltage multiplier circuitry may operate by charging capacitors in parallel and discharging capacitors in series. Of course, an exemplary compressor unit and/or an exemplary turbine unit may include a power storage and/or circuitry. Further, an exemplary turbine unit may produce sufficient on-line power to operate a compressor unit directly (e.g., optionally via rectifier circuitry) and thereby allow for bypassing a power storage.

Referring again to FIG. 3, an exemplary intake charge boost system may require only up to a few seconds or so of compressor operation to reduce lag. Therefore, power storage, controller and/or power electronics are optionally designed to operate intermittently to provide a compressor with bursts of power, for example, wherein each burst does not exceed approximately 10 seconds. Of course, power storage, controller and/or power electronics for longer bursts (e.g., greater than approximately 10 seconds) and/or shorter bursts (e.g., less than approximately 10 seconds) are also possible. An exemplary method may include start-up through use of stored power (e.g., capacitor and/or battery) followed by use of on-line power from a turbine generator. In such an exemplary method, stored power is used for only a few seconds (e.g., approximately 2 seconds to approximately 3 seconds). Consider an exemplary method that includes discharging one or more capacitors to power an electric compressor unit for approximately 3 seconds and switching to on-line power from a electric turbine unit operating as a generator, or alternatively, switching to another capacitor or group of capacitors. In the latter example, an on-line electric turbine unit operating as a generator optionally charges one or more capacitors while one or more other capacitors are being discharged.

Figure 5:
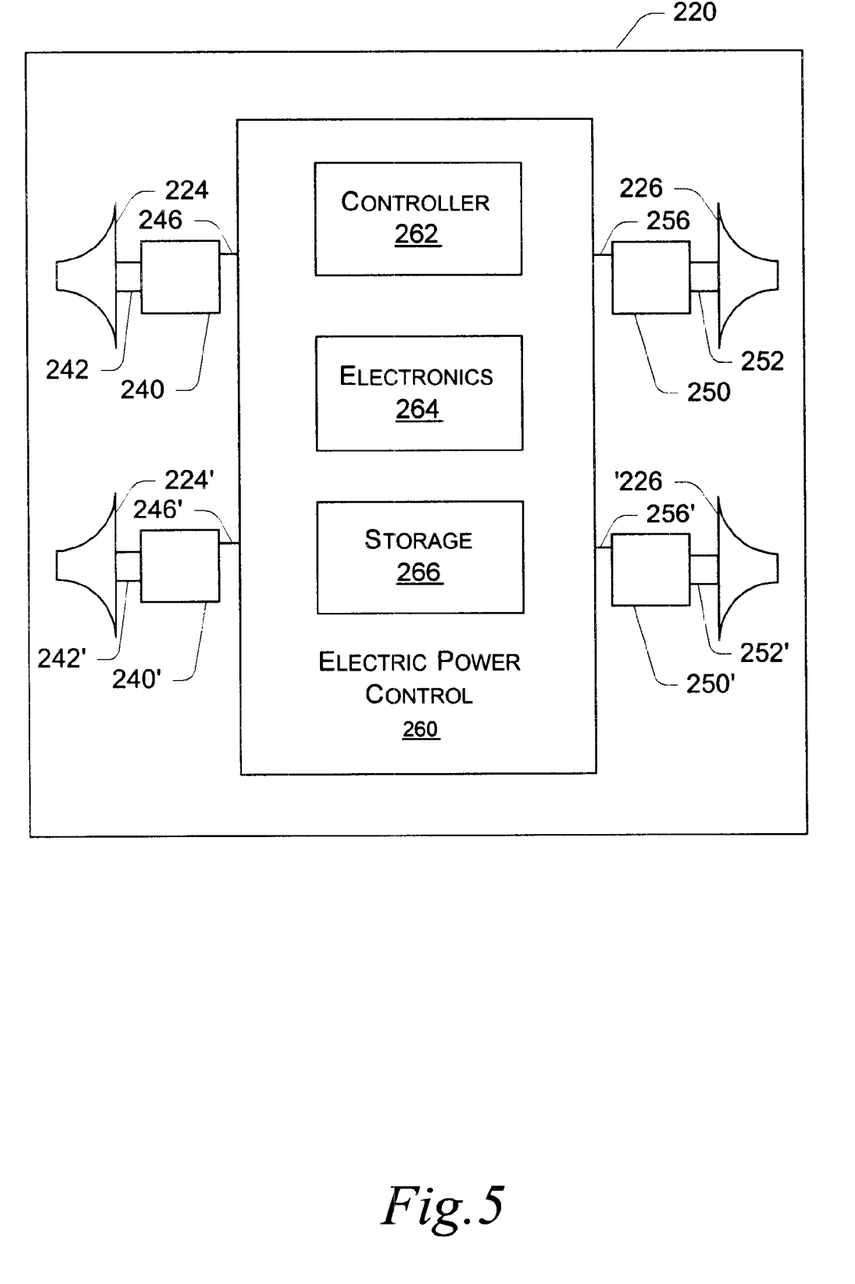
FIG. 5 is a block diagram illustrating an exemplary boost system having one or more compressors and/or one or more turbines.

Referring to FIG. 5, a block diagram of the exemplary system 220 of FIG. 4 is shown wherein the exemplary system includes more than one electric compressor unit 240, 240' and/or more than one electric turbine unit 250, 250'. Use of more than one turbine and/or more than one compressor may allow for enhanced performance. For example, multiple compressors may operate in stages depending on performance requirements. Consider a small increase in demand where one compressor adequately provides boost and a large increase in demand where two or more compressors provide boost. In addition, one turbine may provide enough electrical power to drive more than one compressor or more than one turbine may provide electrical power for one compressor. Of course a variety of other configurations are possible through use of one or more compressors and/or one or more turbines.

Referring again to FIG. 5, in the exemplary system 220, various exemplary units have links to the electric control unit 260 for power and/or communication of information pertaining to control (e.g., control parameters, etc.). The exemplary system 220 shown in FIG. 4 and/or FIG. 5 optionally include an isolated and/or a separate electrical system that is isolated and/or separate from a vehicle's primary electrical system.

Figure 6:
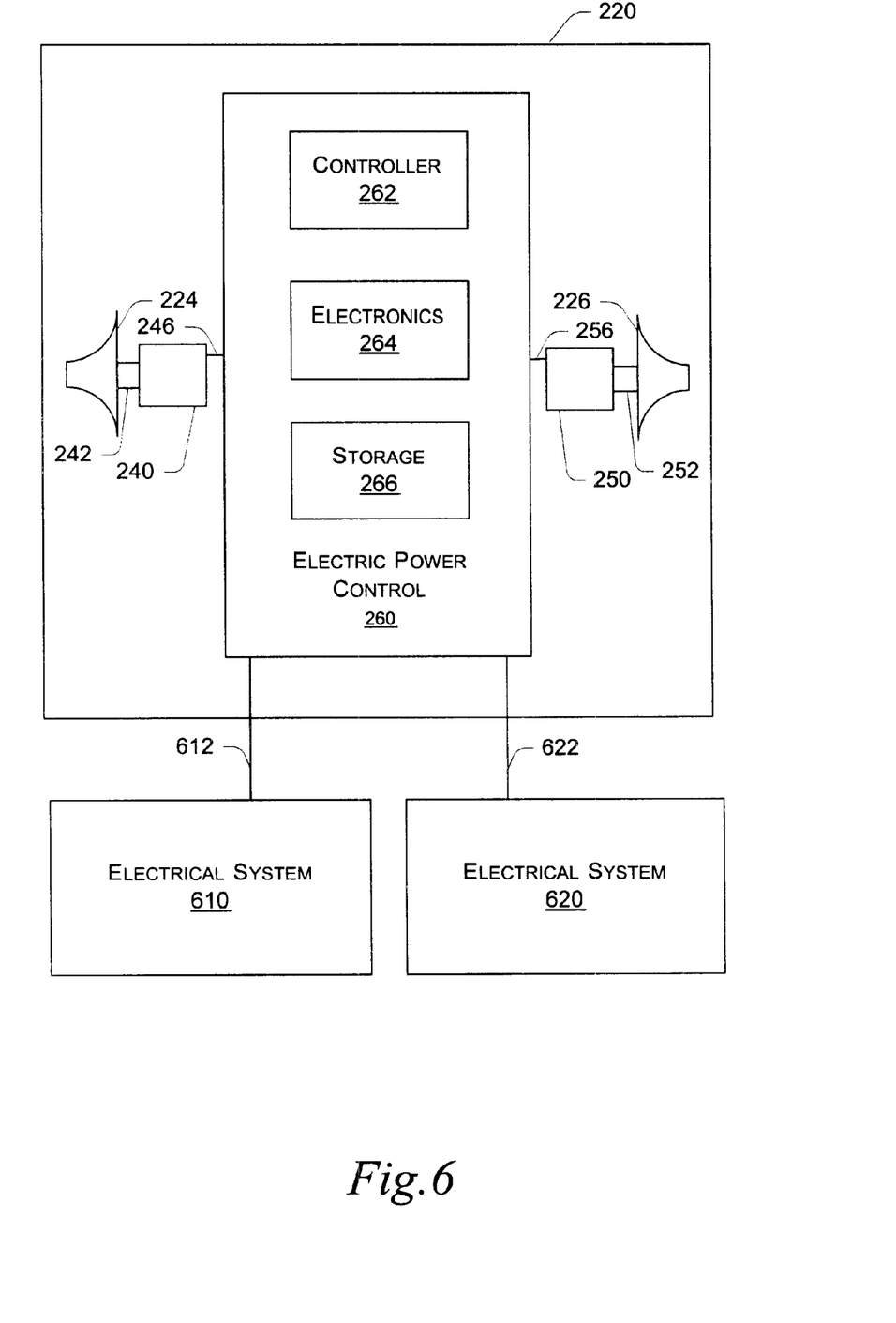
FIG. 6 is a block diagram illustrating the exemplary boost system of FIG. 4, further including one or more electrical systems.

Referring to FIG. 6, a block diagram of the exemplary system 220 of FIG. 4 is shown along with one or more electrical system blocks 610, 620. As shown in FIG. 6, the electrical system block 610 optionally corresponds to an electrical system operating at a voltage and power sufficient to run one or more electric compressor units (e.g., the compressor units 240, 240' of FIG. 5); whereas the electrical system block 620 optionally corresponds to an electrical system operating at a voltage and power sufficient to run a vehicle's other electrical needs (e.g., glow plugs, ignition, starter motor, lights, computer, etc.).

As shown in FIG. 6, a link 612 exists between the electric control unit 260 and the electrical system block 610 and another link 622 exists between the electric control unit 260 and the electrical system-block 620. The link 612 and/or the link 622 typically operate to communicate information and/or power related to operation of an electric compressor unit and/or an electric turbine unit. For example, a vehicle's primary electrical system (e.g., associated with one or more batteries used for electrical needs) optionally provides power via the link 622 to operate a controller (e.g., the controller 262) or the like, which, in turn, controls power associated with an electrical system that operates at a higher voltage than the vehicle's primary electrical system. Of course, power generated by an electric turbine unit (e.g., the turbine unit 250) optionally generates power for control and for powering one or more electric compressor units (e.g. the compressor unit 240). In such an exemplary system, a rectifier or the like optionally converts time variant voltage to one or more DC voltages, wherein one voltage may power control and another voltage powers a motor associated with an electric compressor unit (e.g., the compressor unit 240).

Referring again to the set of graphs 120 of FIG. 3, in a typical turbocharger and internal combustion engine system, a demand for increased power usually results in an increase in fuel flow to the engine; however, upon an increase in fuel flow, combustion efficiency may be limited by inadequate airflow. In response to the increase in fuel flow, however, heat release does increase, which, in turn, typically increases exhaust temperature and engine back-pressure. In response, the turbine is able to extract some additional energy from the exhaust, which, in turn, increases power to the compressor. In such a system, while the turbocharger's shaft speed increases, speed is resisted in part by turbine and/or compressor inertia (i.e., the turbine and compressor are typically attached to the same shaft). In spite of such resistance, an increase in shaft speed typically occurs, which causes the compressor to increase airflow to the engine thereby providing a more adequate airflow for a given fuel flow. Again, this process often results in a condition known as "turbo lag". As already mentioned, various exemplary methods, devices, and/or systems described herein optionally operate to reduce and/or eliminate conditions such as, but not limited to, turbo lag.

An exemplary boost and/or generation system, such as the system 220 of FIG. 2 or FIG. 6, an electric compressor unit and an electric turbine unit include respective shafts that can rotate at the same or at different speeds. Such a system allows each shaft to rotate at a speed different from that of another shaft(s). Indeed, shafts may rotate at speeds independent from one another. In addition, turbine and compressor inertia are essentially decoupled. Thus, compressor size, weight, etc., are optionally determined independent of turbine size, weight, etc. and vice versa. For example, a compressor associated with an electric compressor unit is optionally larger and more efficient than a compressor associated with a shaft and turbine assembly (e.g., a compressor associated with the turbocharger unit 120 of FIG. 1).

Figure 7:
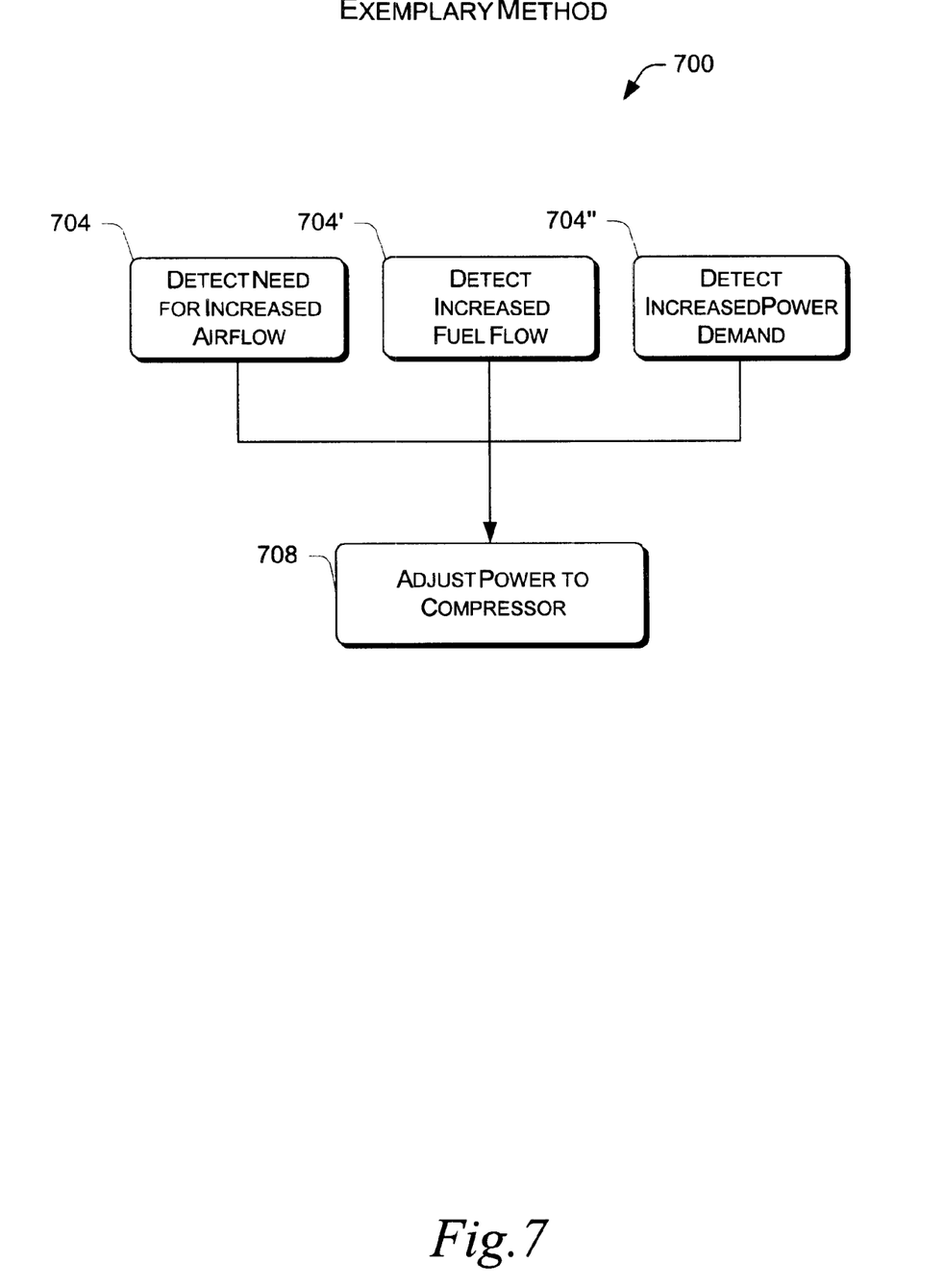
FIG. 7 is a block diagram illustrating an exemplary method for boosting intake charge pressure.

Referring to FIG. 7, a block diagram of an exemplary method 700 is shown. According to the exemplary method 700, in one or more detection blocks 704, 704', 704", an electric control unit (e.g., the electric control unit 260 of FIG. 2) and/or other component detects a need or receives a request for increased airflow 704, a need or a request for increased fuel flow 704', and/or a need or request for increased power 704" (e.g., detection of an increased power demand). A control block 708 (e.g. the electric control unit 260 of FIG. 2) receives information from one or more of the detection blocks 704, 704', 704" (directly and/or indirectly) and, in response, appropriately adjusts power to one or more electric compressor units.

Figure 8:
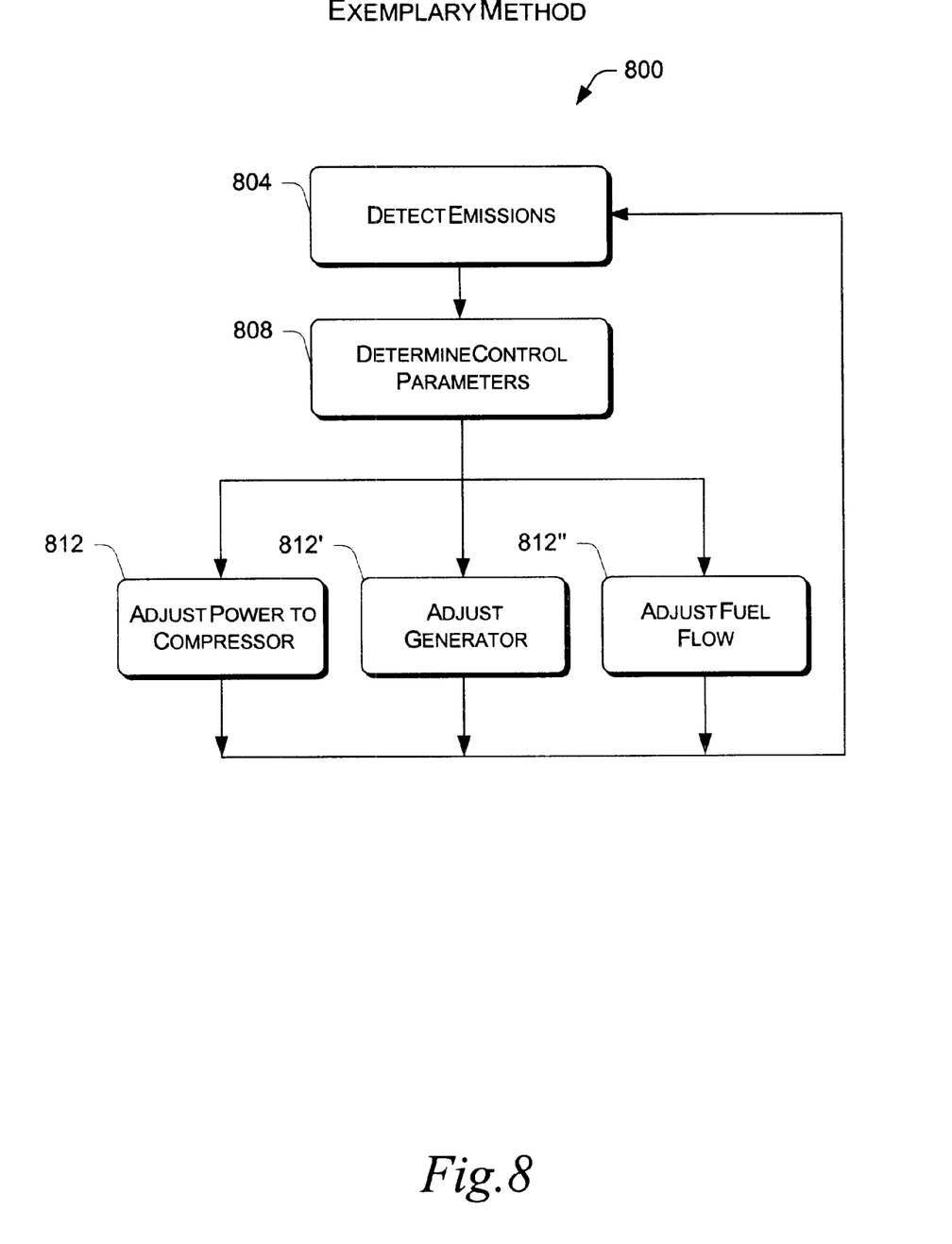
FIG. 8 is a block diagram illustrating an exemplary method for making adjustments to improve emissions.

Referring to FIG. 8, another exemplary method 800 is shown. In a detection block 804, a detector detects emissions. Of course, emissions may be determined on the basis of operating conditions and/or other information. Next, a determination block 808 (e.g. the electric control unit 260 of FIG. 2) determines one or more control parameters in response to the detected emissions wherein the one or more control parameters are communicable as control signals. Various adjustment blocks 812, 812', 812" follow, as appropriate. For example, the adjustment block 812 receives a control signal to adjust power to a compressor, the adjustment block 812' receives a control signal to adjust a turbine generator, and the adjustment block 812" receives a control signal to adjust fuel flow. Accordingly, adjustment of a compressor, a turbine generator and/or fuel flow may allow for improved emissions. Yet further, such adjustments may allow for improved aftertreatment of exhaust. For example, one or more adjustments may allow for more efficient operation of a catalytic converter or other aftertreatment technology. Consider a catalytic converter having an optimal operating temperature, exhaust flow rate and/or exhaust load (e.g., concentration of one or more chemical species). Adjustment of a compressor, a turbine generator and/or fuel flow may, for example, cause an increase in exhaust temperature, a decrease in exhaust load, etc.

Figure 9:
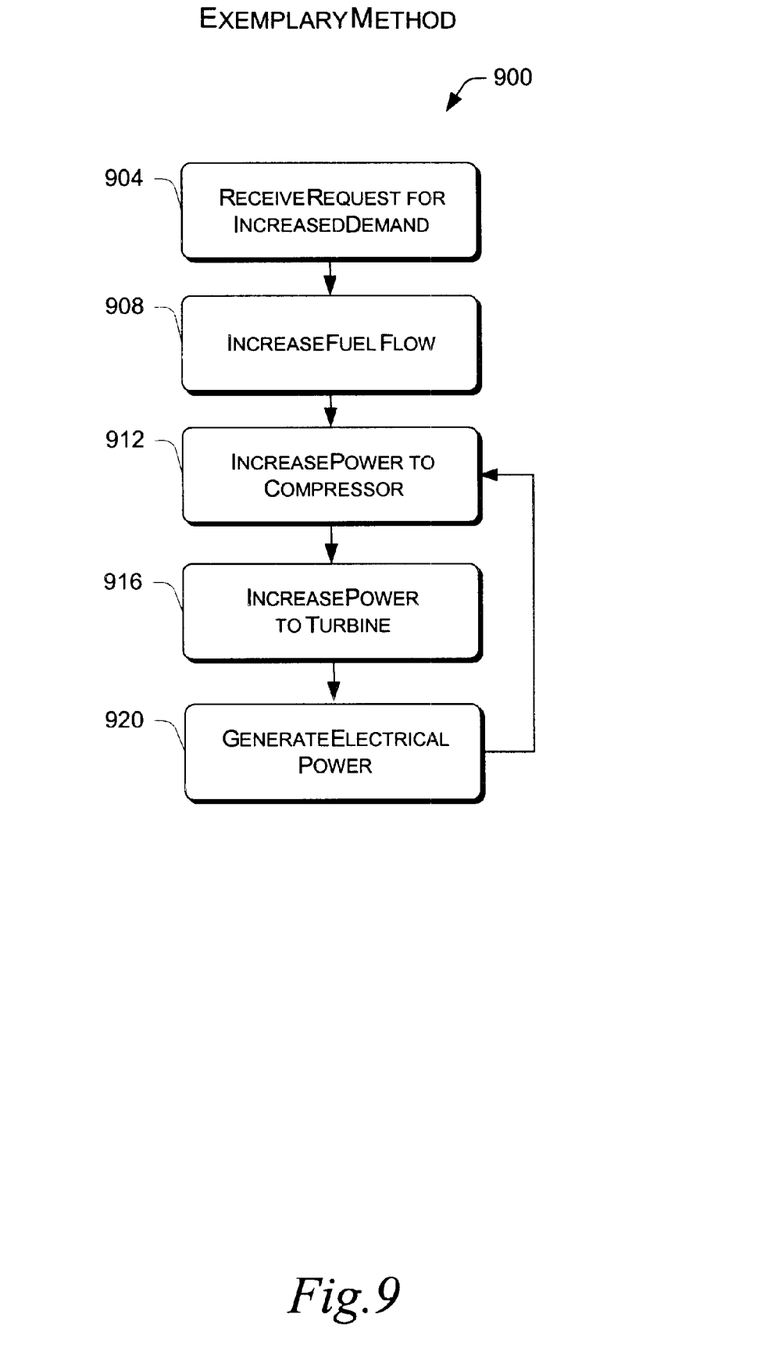
FIG. 9 is a block diagram illustrating an exemplary method for boosting intake pressure and extracting energy from exhaust.

Referring to FIG. 9, a block diagram of an exemplary method 900 is shown. In a reception block 904, an electric control unit (e.g., the electric control unit 260 of FIG. 2), receives information regarding an increase in demand (e.g., the demand "D/F" as shown in FIG. 3). Often, such an increase in demand is associated with and/or a result of a need for an increase in fuel flow or an actual increase in fuel flow. As shown in FIG. 9, in an "increase fuel flow" block 908, fuel flow to an engine is increased. In general, fuel includes hydrogen and/or carbon based fuel that is typically mixed with a combustion gas. In an "increase power to compressor" block 912, an electric control unit provides increased power to one or more electric compressor units. For example, the electric control unit may provide power from a power storage (e.g., capacitor, battery, etc.), alternatively, the electric control unit may provide on-line power from a generator. The functions performed in blocks 908 and 912 optionally occur simultaneously. In an "increase power to turbine" block 916, at least in part, the increase in power to the one or more electric compressor units results in an increase in power from combustion, which, in turn, results in an increase in exhaust energy. As indicated by block 916, the increase in exhaust energy translates to an increase in power to a turbine. The resulting increase in power to the turbine allows an electric turbine unit to generate electrical power, as indicated by the generation block 920. As shown in FIG. 9, generation of electrical power allows for further increase in power to one or more electric compressor units. For example, the generation block 920 may allow for prolonged electric compressor operation in the case of depletion of a power storage or it may allow for recharging of a power storage. Further, an additional increase in fuel flow may occur via the increase fuel flow block 908.

An exemplary system capable of performing the exemplary method 900 allows a compressor and a turbine to rotate at different speeds, uses an electrical power system separate from a vehicle's primary electrical system wherein the electrical power system operates at a higher voltage than the primary system, includes one or more capacitors capable of storing power sufficient for approximately 3 seconds of compressor operation, and/or uses a turbine that is larger and more efficient than a turbine typically associated with a turbocharger because turbine inertia is not a significant factor in acceleration of an electrical compressor unit. An exemplary system may also include a switch for switching operation of an electric motor from a power storage to another power source. In addition, the switch may allow for recharging of a power storage. For example, after depletion of a power storage, a switch may switch to another power source to power an electric motor and/or recharge the power storage.

As already mentioned, in a typical turbocharger and internal combustion engine system, a demand for increased power usually results in an increase in fuel flow to the engine; however, at such a point, combustion efficiency is typically limited by inadequate airflow. Variable geometry turbochargers (VGTs), such as, but not limited to, the GARRETT® VNT™ and AVNT™ (Garrett Corporation) turbochargers, which use multiple adjustable vanes to control the flow of exhaust across a turbine, can address such airflow issues. Adjustable vanes positioned at an inlet to a turbine typically operate to control flow of exhaust to the turbine. For example, GARRETT® VNT™ turbochargers adjust the exhaust flow at the inlet of a turbine in order to optimize turbine power with the required load. Movement of vanes towards a closed position typically directs exhaust flow more tangentially to the turbine, which, in turn, imparts more energy to the turbine and, consequently, increases compressor boost of an associated turbocharger compressor. Conversely, movement of vanes towards an open position typically directs exhaust flow in more radially to the turbine, which, in turn, reduces energy to the turbine and, consequently, decreases compressor boost. Thus, at low engine speed and small exhaust gas flow, a VGT turbocharger may increase turbine power and boost pressure; whereas, at fall engine speed/load and high gas flow, a VGT turbocharger may help avoid turbocharger overspeed and help maintain a suitable or a required boost pressure. A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response and/or wear. Of course, a turbocharger may employ wastegate technology as an alternative or in addition to aforementioned variable geometry technologies.

In a VGT turbocharger, in response to the increase in fuel flow, geometry is adjusted to increase exhaust backpressure (and typically temperature) beyond that associated with a typical turbocharger. In response, the turbine is able to extract some additional energy from the exhaust, which, in turn, increases power to the compressor. In such a system, while the turbocharger's shaft speed increases, speed increase is resisted in part by turbine and/or compressor inertia; however, in general, an increase in shaft speed causes the compressor to increase airflow to the engine, which, in turn, provides a more adequate airflow for a given fuel flow. While a variable geometry turbocharger may offer improvements over a typical turbocharger, this process may still result in "turbo lag".

Figure 10:
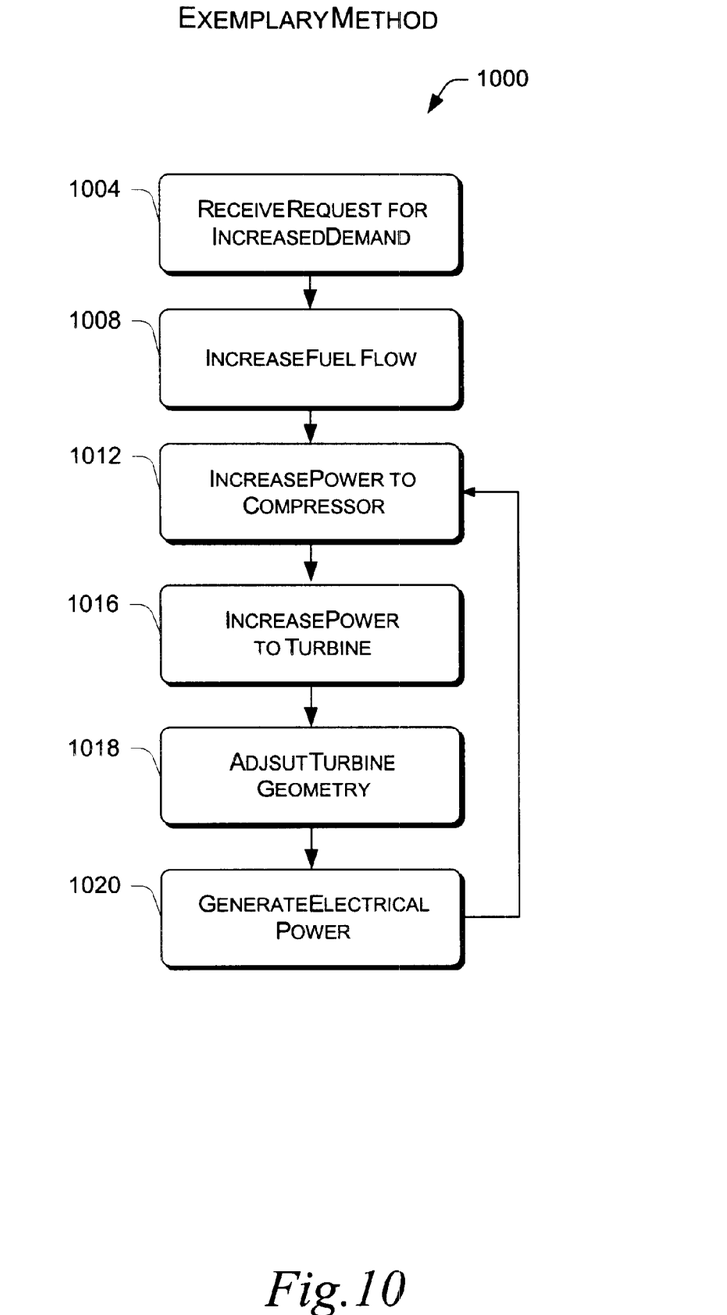
FIG. 10 is a block diagram illustrating an exemplary method for boosting intake charge pressure of a combustion engine using, in part, a variable geometry turbine.

Referring to FIG. 10, a block diagram of an exemplary method 1000 is shown. The exemplary method 1000 relies on use of a variable geometry turbine. In a reception block 1004, an electric control unit (e.g., the electric control unit 260 of FIG. 2), receives information regarding an increase in demand (e.g., the demand "D/F" as shown in FIG. 3). Often, such an increase in demand is associated with and/or a result of a need for increase in fuel flow or an increase in fuel flow. As shown in FIG. 10, in an "increase fuel flow" block 1008, fuel flow to an engine is increased. In general, fuel includes hydrogen and/or carbon based fuel that is typically mixed with a combustion gas. In an "increase power to compressor" block 1012, an electric control unit provides increased power to one or more electric compressor units. For example, the electric control unit may provide power from a power storage (e.g., capacitor, battery, etc.), alternatively, the electric control unit may provide on-line power from a generator. The functions performed in blocks 1008 and 1012 optionally occur simultaneously. In an "increase power to turbine" block 1016, the increase in power to the one or more electric compressor units results in an increase in power from combustion, which, in turn, results in an increase in exhaust energy. As indicated by block 1016, the increase in exhaust energy translates, typically, to an increase in power to a turbine. Simultaneously, before, and/or after, the increase power to turbine block 1016, an adjustment block 1018 optionally adjusts turbine geometry of the variable geometry turbine to increase exhaust energy to the turbine. The adjustment block 1018 optionally responds to receipt of commands and/or control parameters transmitted by a control unit. In a particular example, a delay occurs before an adjustment in turbine geometry whereby the adjustment increases exhaust back pressure.

The resulting increase in power to the turbine (e.g., through increased combustion energy and/or geometry adjustment) allows an electric turbine unit to generate electrical power, as indicated by the generation block 1020. As shown in FIG. 10, generation of electrical power allows for further increase in power to one or more electric compressor units. For example, the generation block 1020 may allow for prolonged electric compressor operation in the case of depletion of a power storage or it may allow for recharging of a power storage. Further, an additional increase in fuel flow may occur via the increase fuel flow block 1008. Of course, such an electric compressor unit optionally operates in conjunction with a typical turbocharger or a VGT turbocharger. Further, the number of electric compressor units and the number of turbines may differ. For example, referring to FIG. 5, one electric turbine unit (e.g., the turbine unit 250) may power two electric compressor units (e.g., the compressor units 240, 240'). In addition, any number of turbines optionally includes variable geometry capabilities.

Although some exemplary methods, devices and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method comprising:
   receiving a request for increased output of an internal combustion engine;
   responsive to the request, providing stored power to an electric compressor unit for approximately three seconds or less to thereby increase intake charge pressure to the internal combustion engine;
   generating electrical power using an electric turbine unit configured to extract energy from exhaust produced by the internal combustion engine; and
   providing the generated electrical power to one or more members selected from the group consisting of the electric compressor unit and a power storage.

2. The method of claim 1, further comprising adjusting geometry of a variable geometry turbine of the electric turbine unit.

3. The method of claim 2, wherein the adjusting increases exhaust back pressure of the internal combustion engine.

4. The method of claim 1, further comprising increasing fuel flow to the internal combustion engine.

5. The method of claim 4, wherein the increasing fuel flow and the providing stored power to an electric compressor unit occur simultaneously.

6. The method of claim 1, wherein the providing stored power includes discharging a capacitor and/or a battery.

7. The method of claim 1, wherein a first rotatable shaft operatively coupled to a compressor of the electric compressor unit optionally rotates at a speed different than that of a second rotatable shaft operatively coupled to a turbine of the electric turbine unit.

8. One or more computer-readable media having computer-readable instructions thereon which, when executed by a programmable device, perform the method of claim 1.

9. An electric compressor for boosting intake charge supplied to an internal combustion engine, the electric compressor comprising:
  a compressor operatively coupled to a rotatable shaft;
  an electric motor operatively coupled to the rotatable shaft;
  a power storage configured to provide stored electrical power to the electric motor wherein the power storage comprises one or more supercapacitors; and
  a power input configured to receive electrical power from a power source to accomplish one or more tasks selected from the group consisting of charging the one or more supercapacitors and providing electrical power to the electric motor.

10. The electric compressor of claim 9, further comprising a switch configured to provide electrical power, from the power source and via the power input, to the electric motor upon discharge of the one or more supercapacitors.

11. The electric compressor of claim 9, wherein the electric compressor and the power source are electrically isolated from any other electrical system associated with the internal combustion engine.

12. The electric compressor of claim 9, wherein the electric compressor and the power source operate at a voltage greater than approximately 24 volts.

13. The electric compressor of claim 9, wherein the power source includes an electric turbine comprising a turbine operatively coupled to another rotatable shaft and a generator configured to generate electrical power upon rotation of the other rotatable shaft.

14. An apparatus comprising:
  an electric compressor to boost intake charge pressure supplied to an internal combustion engine;
  an electric turbine to generate electrical power from exhaust received from the internal combustion engine; and
  an electric power control to provide electrical power from a power storage to the electric compressor for approximately three seconds or less upon a request for boost and to provide electrical power generated by the electric turbine to the electric compressor after a request for boost and upon a depletion of the power storage to a predetermined power storage level.

15. The apparatus of claim 14, wherein the power storage comprises one or more supercapacitors.

16. The apparatus of claim 14, wherein the electric compressor comprises a first rotatable shaft and the electric turbine comprises a second rotatable shaft and wherein the first rotatable shaft and the second rotatable shaft optionally rotate at different speeds.

17. A method comprising:
  receiving a request for increased output of an internal combustion engine;
  responsive to the request, providing stored power to an electric compressor unit to thereby increase intake charge pressure to the internal combustion engine;
  adjusting geometry of a variable geometry turbine of an electric turbine unit configured to extract energy from exhaust produced by the internal combustion engine;
  generating electrical power using the electric turbine unit; and
  providing the generated electrical power to one or more members selected from the group consisting of the electric compressor unit and a power storage.

18. The method of claim 17, wherein the adjusting increases exhaust back pressure of the internal combustion engine.

19. The method of claim 17, further comprising increasing fuel flow to the internal combustion engine.

20. The method of claim 19, wherein the increasing fuel flow and the providing stored power to an electric compressor unit occur simultaneously.

21. The method of claim 17, wherein the providing stored power includes discharging one or more members selected from the group consisting of capacitors and batteries.

22. The method of claim 17, wherein the providing stored power to the electric compressor unit occurs for approximately 3 seconds or less.

23. The method of claim 17, wherein a first rotatable shaft operatively coupled to a compressor of the electric compressor unit optionally rotates at a speed different than that of a second rotatable shaft operatively coupled to a turbine of the electric turbine unit.

24. One or more computer-readable media having computer-readable instructions thereon which, when executed by a programmable device, perform the method of claim 17.

25. A method comprising:
  receiving a request for increased output of an internal combustion engine;
  responsive to the request, providing stored power to an electric compressor unit to thereby increase intake charge pressure to the internal combustion engine;
  increasing fuel flow to the internal combustion engine;
  generating electrical power using an electric turbine unit configured to extract energy from exhaust produced by the internal combustion engine; and
  providing the generated electrical power to one or more members selected from the group consisting of the electric compressor unit and a power storage.

26. The method of claim 25, further comprising adjusting geometry of a variable geometry turbine of the electric turbine unit.

27. The method of claim 26, wherein the adjusting increases exhaust back pressure of the internal combustion engine.

28. The method of claim 25, wherein the increasing fuel flow and the providing stored power to an electric compressor unit occur simultaneously.

29. The method of claim 25, wherein the providing stored power includes discharging one or more members selected from the group consisting of capacitors and batteries.

30. The method of claim 25, wherein the providing stored power to the electric compressor unit occurs for approximately 3 seconds or less.

31. The method of claim 25, wherein a first rotatable shaft operatively coupled to a compressor of the electric compressor unit optionally rotates at a speed different than that of a second rotatable shaft operatively coupled to a turbine of the electric turbine unit.

32. One or more computer-readable media having computer-readable instructions thereon which, when executed by a programmable device, perform the method of claim 25.

33. An electric compressor for boosting intake charge supplied to an internal combustion engine, the electric compressor comprising:
- a compressor operatively coupled to a rotatable shaft;
- an electric motor operatively coupled to the rotatable shaft;
- a power storage configured to provide stored electrical power to the electric motor wherein the power storage comprises one or more capacitors; and
- a power input configured to receive electrical power from a power source to accomplish one or more tasks selected from the group consisting of charging the one or more capacitors and providing electrical power to the electric motor, wherein the power source and the electric motor operate at a voltage greater than approximately 24 volts.

34. The electric compressor of claim 33, wherein the one or more capacitors comprise supercapacitors.

35. The electric compressor of claim 33, further comprising a switch configured to provide electrical power, from the power source and via the power input, to the electric motor upon discharge of the one or more capacitors.

36. The electric compressor of claim 33, wherein the electric compressor and the power source are electrically isolated from any other electrical system associated with the internal combustion engine.

37. The electric compressor of claim 33, wherein the power source includes an electric turbine comprising a turbine operatively coupled to another rotatable shaft and a generator configured to generate electrical power upon rotation of the other rotatable shaft.

\* \* \* \* \*